US008560936B2

(12) United States Patent
Merkel et al.

(10) Patent No.: US 8,560,936 B2
(45) Date of Patent: Oct. 15, 2013

(54) METHODS AND COMPUTER SYSTEMS FOR DISPLAYING TIME VARIANT TABULAR DATA

(75) Inventors: Michael Merkel, Ilvesheim (DE); Marlies Meessen, Leimen (DE)

(73) Assignee: SAG AG, Walldorf (DE)

( * ) Notice: Subject to any disclaimer, the term of this patent is extended or adjusted under 35 U.S.C. 154(b) by 2012 days.

(21) Appl. No.: 10/335,110

(22) Filed: Dec. 31, 2002

(65) Prior Publication Data

US 2004/0010751 A1    Jan. 15, 2004

(30) Foreign Application Priority Data

Jul. 10, 2002    (EP) ...................................... 02015347

(51) Int. Cl.
*G06F 17/00*    (2006.01)

(52) U.S. Cl.
USPC ......................................................... 715/227

(58) Field of Classification Search
USPC ........................... 715/509, 503, 227; 707/509
See application file for complete search history.

(56) References Cited

U.S. PATENT DOCUMENTS

| | | | |
|---|---|---|---|
| 4,933,842 A * | 6/1990 | Durbin et al. ............... | 705/36 R |
| 5,317,306 A | 5/1994 | Abraham et al. | |
| 5,386,559 A * | 1/1995 | Eisenberg et al. ............ | 707/201 |
| 5,621,876 A | 4/1997 | Odam et al. | |
| 5,786,814 A * | 7/1998 | Moran et al. ................... | 715/720 |
| 5,873,108 A * | 2/1999 | Goyal et al. ................... | 715/507 |
| 5,883,635 A * | 3/1999 | Rao et al. ....................... | 345/440 |
| 6,313,848 B1 | 11/2001 | Hoag | |
| 6,522,347 B1 * | 2/2003 | Tsuji et al. ..................... | 715/848 |
| 7,003,504 B1 * | 2/2006 | Angus et al. ...................... | 707/1 |
| 7,146,574 B2 * | 12/2006 | Goldthwaite et al. ......... | 715/838 |
| 2001/0054034 A1 * | 12/2001 | Arning et al. ...................... | 707/1 |
| 2002/0073100 A1 * | 6/2002 | Buchner .................... | 707/104.1 |
| 2004/0205521 A1 * | 10/2004 | Geuss et al. ................... | 715/503 |

OTHER PUBLICATIONS

Snodgrass, "The Temporal Query Language TQuel", ACM Transactions on Database Systems (TODS), vol. 12, Issue 2, p. 247-298, published Jun. 1987.*
Dekhtyar, et al. "Probabilistic Temporal Databases, I: Algebra", ACM Transactions on Database Systems (TODS), vol. 26, Issue 1, published Mar. 2001, p. 41-95.*
Courter et al., "Mastering Microsoft Office 2000 Professional Edition", copyright 1999, SYBEX Inc., p. 541-600 and 639-676.*

* cited by examiner

*Primary Examiner* — Amelia Rutledge
(74) *Attorney, Agent, or Firm* — Finnegan, Henderson, Farabow, Garrett & Dunner, LLP (57) ABSTRACT

The present invention relates to methods and systems for displaying tabular data. The tabular data comprises first data descriptive of instances of an entity and second data comprising time variant parameter values. The parameter values are analyzed to identify time intervals, where none of the parameter values of any of the instances changes. These time intervals form the basis for the generation of subsets of the tabular data to be displayed on a graphical user interface.

16 Claims, 7 Drawing Sheets

FIG. 1

Table for Entity E

| Name of Instance of E | Value of Parameter $P_1$ | Value of Parameter $P_2$ | ... |
|---|---|---|---|
| a | $P_{1a}(I_{1a}), P_{1a}(I_{2a}), P_{1a}(I_{3a}),...$ | $P_{2a}(I_{1a}), P_{2a}(I_{2a}), P_{2a}(I_{3a}),...$ | ... |
| b | $P_{1b}(I_{1b}), P_{1b}(I_{2b}), P_{1b}(I_{3b}),...$ | $P_{2b}(I_{1b}), P_{2b}(I_{2b}), P_{2b}(I_{3b}),...$ | ... |
| c | $P_{1c}(I_{1c}), P_{1c}(I_{2c}), P_{1c}(I_{3c}),...$ | $P_{2c}(I_{1c}), P_{2c}(I_{2c}), P_{2c}(I_{3c}),...$ | ... |
| ... | ... | ... | |

0
METHODS AND COMPUTER SYSTEMS FOR DISPLAYING TIME VARIANT TABULAR DATA

BACKGROUND OF THE INVENTION

1. Field of the Invention

The present invention relates generally to methods and systems for displaying information using computers, and, more particularly, presenting information contained in electronic spreadsheets and databases in tabular form.

2. Description of the Related Art

Spreadsheet and database applications allow users to view and manipulate tabular data, i.e., information organized into rows and columns. Often, the tabular data is too large to fit on a display screen. Existing applications address this problem by providing users with the ability to scroll information both vertically and horizontally. In a windowing desktop environment, such as SAP R/3®, Microsoft Windows® and the like, the problem of fitting information on the screen is exacerbated, because a plurality of windows can appear on the screen simultaneously, and each window may be significantly smaller than the display screen. Furthermore, users of most windowing desktop environments may interactively or dynamically change the size of a window at any time, which may reduce the available space for displaying tabular data.

Several existing systems attempt to overcome the problems encountered when using tables that are wider than the window space available to display them. One prior art method, chiefly implemented in database applications rather than spreadsheet applications, displays records selected for viewing or editing in a separate window or form. The disadvantage of this method is that only one record at a time may be viewed or edited in its entirety, and the viewing or editing window may obscure all or part of the window that displays tabular data in rows and columns.

Another prior art method, taught in U.S. Pat. No. 5,317, 306, allows the user to determine which columns are most important to him or her, and to designate those columns as "sticky." When a table contains more columns of information than can be displayed simultaneously, the user must scroll horizontally to view an entire row. The "sticky" columns remain in the display window when the user enters a command for horizontal scrolling. A similar prior art method is used in Microsoft Corporation's Excel spreadsheet application, in which a user may select a row, column, or cell, and choose to "freeze panes," which splits the window, thereby causing all rows and columns above and to the left of the selected position to remain frozen in place while the rest of the display remains responsive to scrolling commands. In the prior art, a user also may make additional room in the window by designating a row or column as hidden, which suppresses its display until said row or column is unhidden by a user command.

Still another prior art method is disclosed in U.S. Pat. No. 5,621,876, which teaches a method for increasing the number of columns in the display by adding an additional column when the user selects an "increase activator" button. This method makes the window larger, if the additional column will fit on the display screen. Otherwise, it makes the other columns narrower to accommodate the additional column.

Further, U.S. Pat. No. 6,313,848 shows a method of viewing wide tables with reduced need for horizontal scrolling. The method includes the steps of determining the width of each column, determining the height of each row, and determining the dynamic height and width of the workspace available for the display of tabular data within said window and dividing the tabular data into table segments, each table segment comprising one or more columns of said tabular data.

Additional problems are encountered when displaying tabular data that is time variant. For such data, no intuitive display format has been found in the prior art.

It is therefore an object of the present invention to provide improved methods and computer systems for displaying tabular data which enable generation of an intuitive and user friendly display for time variant data.

SUMMARY

The present invention is directed to methods, systems, and computer program products for displaying tabular, time variant data. Methods, systems, and computer program products consistent with the present invention identify and use time intervals to conveniently display tabular data in an intuitive way. Further methods, systems, and computer program products consistent with the present invention enable creation of a graphical user interface that allows a user to conveniently navigate through the time variant tabular data.

In accordance with at least one embodiment of the invention an index is generated. The index comprises the time intervals as keys to tabular data which is valid during a given interval.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

DETAILED DESCRIPTION

In the following detailed description, reference will be made to the accompanying drawings, in which like numerals represent like elements throughout the figures. The accompanying figures illustrate exemplary embodiments of the present invention, which are described in sufficient detail to enable those skilled in the art to practice the invention. It is to be understood that other implementations may be utilized and that structural and method changes may be made without departing from the scope of present invention. The following discussion is, therefore, not to be construed in a limiting sense.

Figure 1:
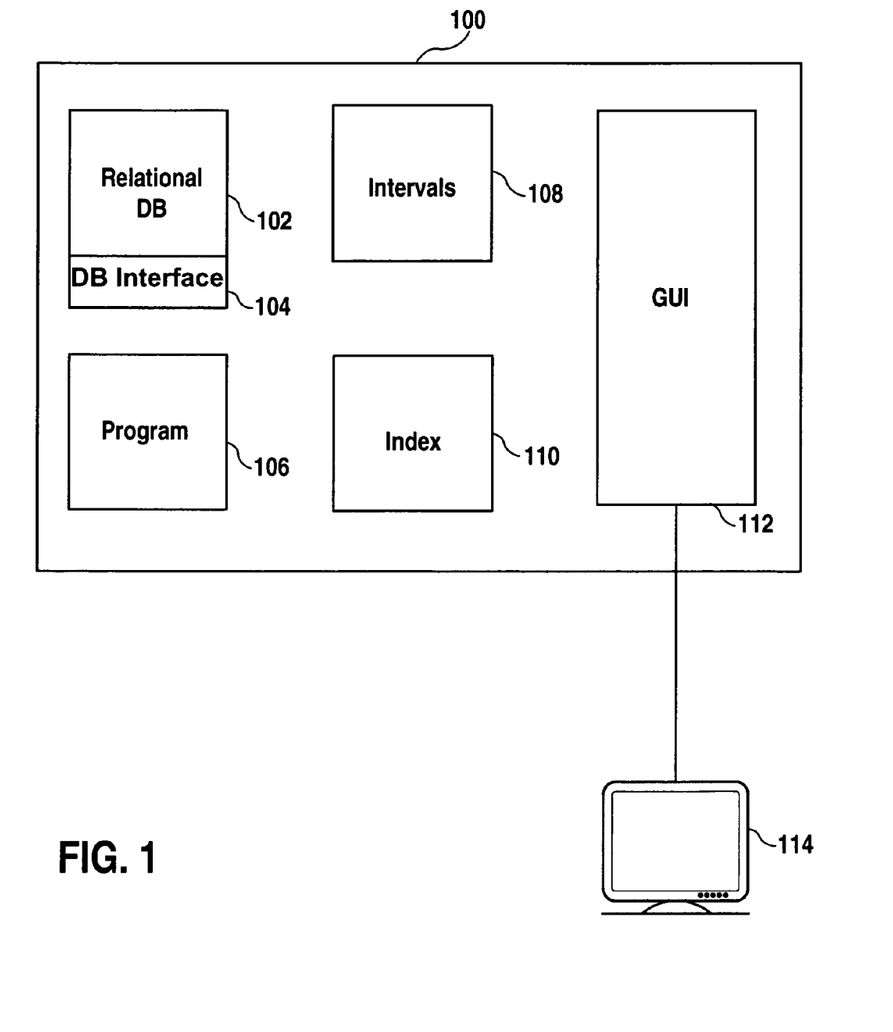
FIG. 1 is a block diagram of a computer system consistent with the principles of the present invention.

One embodiment of the present invention is illustrated, by way of example, in FIG. 1. FIG. 1 shows a computer system 100 having a relational database 102. The relational database 102 has a database interface 104 for exporting time variant tabular data.

Further, computer system 100 has a program 106 which searches tabular data that has been exported from relational database 102 via the interface 104 for time intervals where the data has constant parameter values. Additionally, program 106 enables a user to select a subset of the data contained in the tabular data exported from relational database 102 to form the basis of the analysis.

The intervals identified by program 106 are stored in storage 108. Further, program 106 generates an index using the identified time intervals as keys. The keys serve to access tabular data contained in the tabular data which has been exported from the relational database 102 that is constant during a given one of such intervals. The index is stored in storage 110.

Computer system 100 has a graphical user interface (GUI) 112 which serves to display the tabular data. GUI 112 may contain virtual buttons or pull down or pop up menus which allow a user to interactively navigate the tabular data along a time axis. GUI 112 is coupled to display unit 114.

Figure 2:
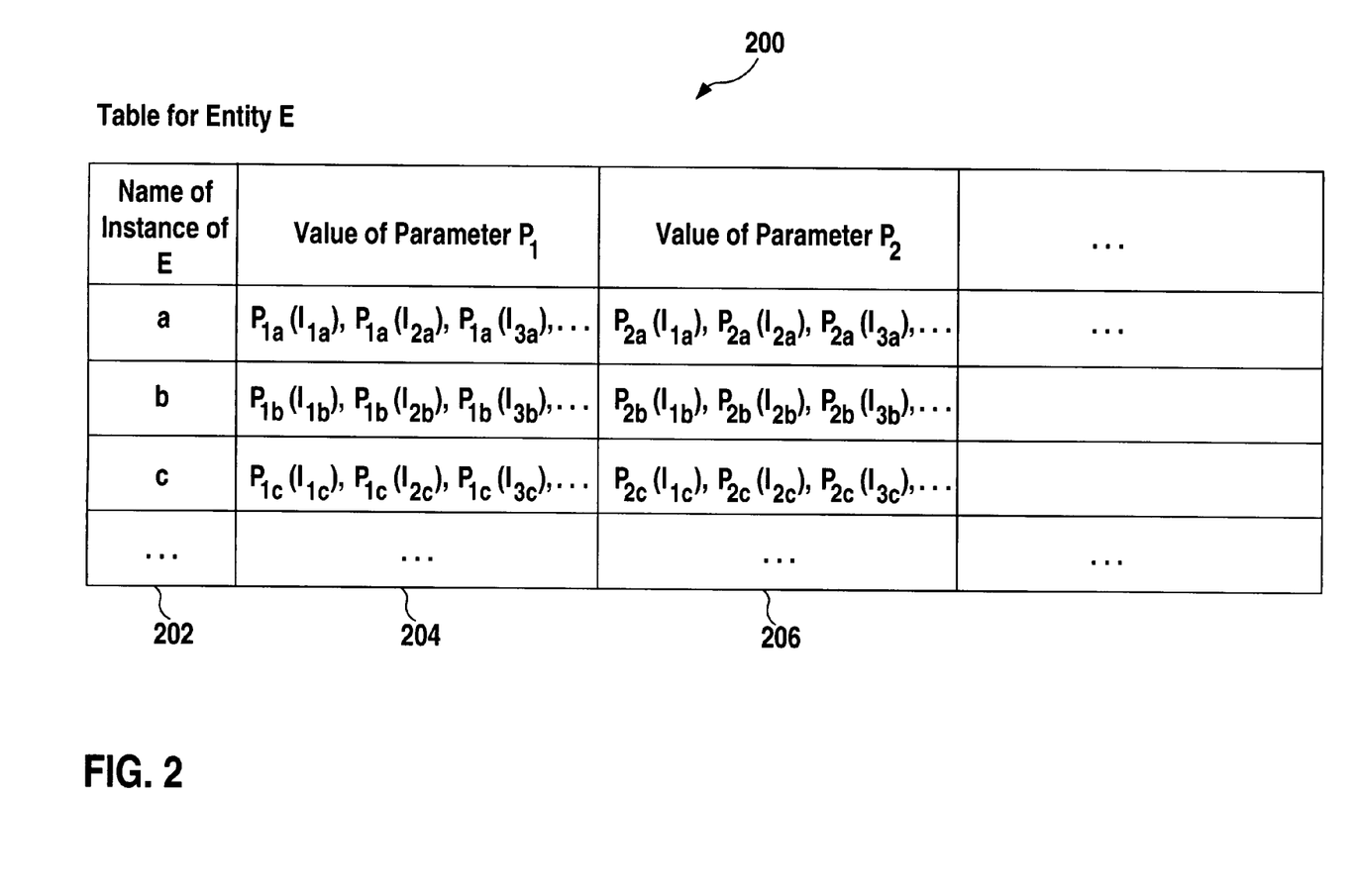
FIG. 2 shows one example of time variant tabular data to be displayed.

FIG. 2 shows a table 200 of tabular data that is exported from relational database 102 (cf. FIG. 1) by way of example. Table 200 contains data which relates to an entity E. In principle, entity E can be of any category such as person, object, place, event or business data. For example, in the case of a business computer system, entity E may relate to customers or customers' orders. In another example, entity E may relate to a building, each of the sections of the building having a specific disposable size and capacity which is time variant.

Table 200 may comprise a column 202 containing the names of instances of entity E. In this exemplary embodiment, the names are represented by "a", "b", "c", etc. For example, a name can designate a certain section of a building, such as garden area, parking area, living area, office area.

Table 200 may also comprise a column 204 containing values of a parameter $P_1$ for the instances of entity E contained in the column 202. The value of parameter $P_1$ is time variant. For example, parameter $P_1$ can indicate the disposable size of a particular section of the building for planning, business or logistic purposes.

The value $P_{1a}(I_{1a})$ represents the value of the parameter $P_1$ of instance a of entity E during the time interval $I_{1a}$. Likewise $P_{1a}(I_{2a})$ represents the value of parameter $P_1$ during a subsequent time interval $I_{2a}$, etc. $P_{1b}(I_{1b})$ represents the value of parameter $P_1$ for the instance b of entity E during the time interval $I_{1b}$. Likewise $P_{1b}(I_{2b})$ represents the value of the parameter $P_1$ of the instance b during a subsequent time interval $I_{2b}$, etc. In other words, each field within the column 204 contains a time series of values of parameter $P_1$ for the corresponding instance. Table 200 further may contain a column 206 for storing time variant values of a parameter $P_2$. For example, parameter $P_2$ can indicate the capacity of a given section of the building. The same nomenclature may be used as was used for parameter $P_1$, that is, $P_{2a}(I_{1a})$ represents the value of parameter $P_2$ of instance a of entity E during the time interval $I_{1a}$, etc.

Figure 3:
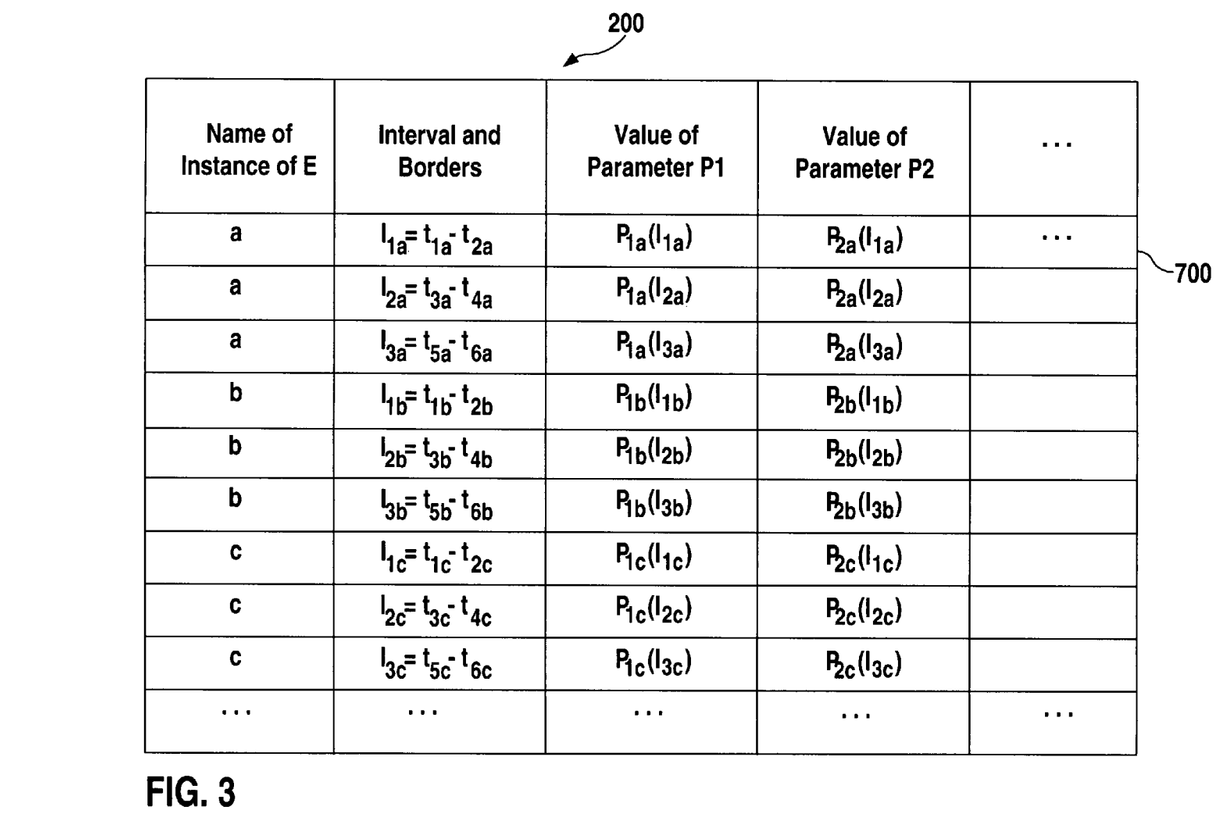
FIG. 3 shows one example of validity time intervals of parameter values of instances of an entity consistent with the present invention.

FIG. 3 shows table 200 in another format where each row of the table corresponds to one time interval I. For example, row 700 may contain the values of $P_{1a}(I_{1a})$ and $P_{2a}(I_{1a})$ for the instance "a" during the time interval $I_{1a}=[t_{1a}, t_{2a}]$. It is to be noted, that the time intervals of validity of parameter $P_2$, i.e. $I_{1a}, I_{2a}, I_{3a}, \ldots$, do not need to be the same as for the parameter $P_1$. However, for simplicity and convenience of explanation only, this assumption is made in the following without restriction of generality.

When table 200 is exported from relational database 102 (cf. FIG. 1), program 106 begins to analyse table 200 in order to identify time intervals during which no change of relevant parameter values occurs. For the purpose of this analysis, a user may select one or more of columns 204, 206, . . . (cf. FIG. 2) of table 200 to be considered for the analysis. In one exemplary embodiment, columns 204 and 206 are analysed by program 106 identify such intervals where the parameter values $P_1$ and $P_2$ do not change. The principles of this analysis are illustrated in FIG. 3.

Figure 4:
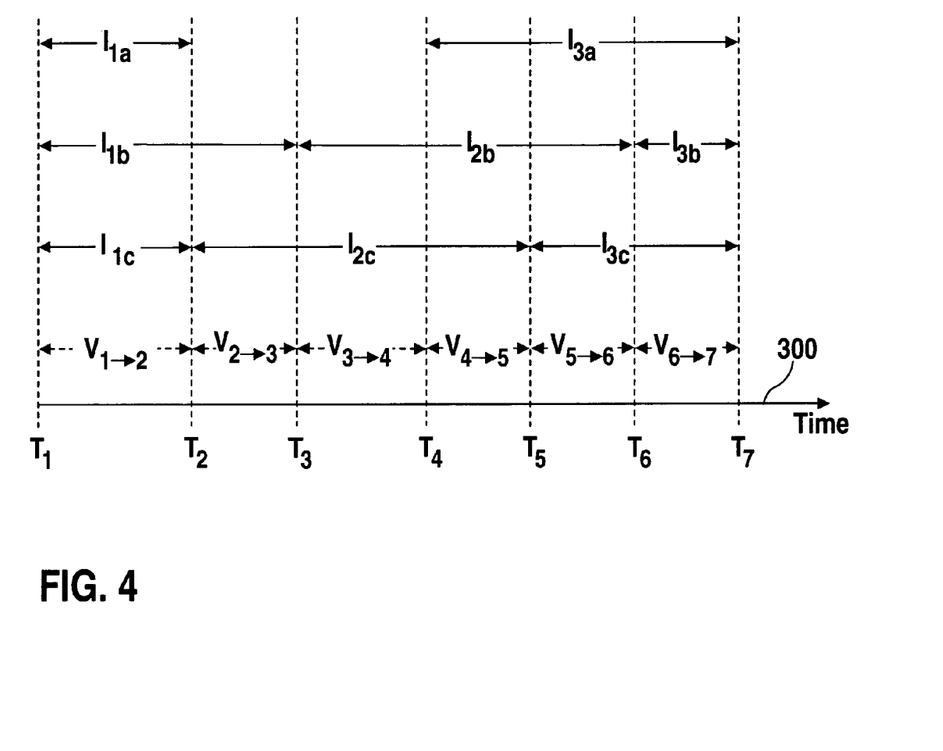
FIG. 4 shows one example of the determination of time intervals for the display of the tabular data of FIG. 2.

FIG. 4 shows a time axis 300 and time intervals $I_{1a}, I_{3a}$; $I_{1b}, I_{2b}, I_{3b}$; $I_{1c}, I_{2c}, I_{3c}$ during which the values of the parameters $P_1$ and $P_2$ of the respective instances a, b and c remain constant. In this exemplary embodiment, time $t_{1a}$ is $T_1=t_{1b}=t_{1c}$. Further in this example $t_{2a}$ is $T_2=t_{2c}$. Likewise $t_{2b}$ is $T_3$ and $t_{5a}$ is $T_4$, etc. It is to be noted that there can be gaps in the tabular data, i.e. time intervals for which there is no data entry. This is the case for the time interval $I_{2a}$ of instance a.

Computer program 106 (cf. FIG. 1) identifies such time intervals V during which all of the parameter values $P_1$ and $P_2$ considered remain constant for all of the instances of the considered entity E. For example, all of the parameter values of parameters $P_1$ and parameters $P_2$ remain unchanged between the times $T_1$ and $T_2$. The corresponding time interval identified by program 106 is designated as $V_{1 \to 2}$, etc. Further, all of the parameter values of parameters $P_1$ and parameters $P_2$ remain unchanged between the times $T_2$ and $T_3$. It is to be noted that the instance "a" is not considered for the corresponding time interval $V_{2 \to 3}$ as there is no data for "a" within that time interval.

Figure 5:
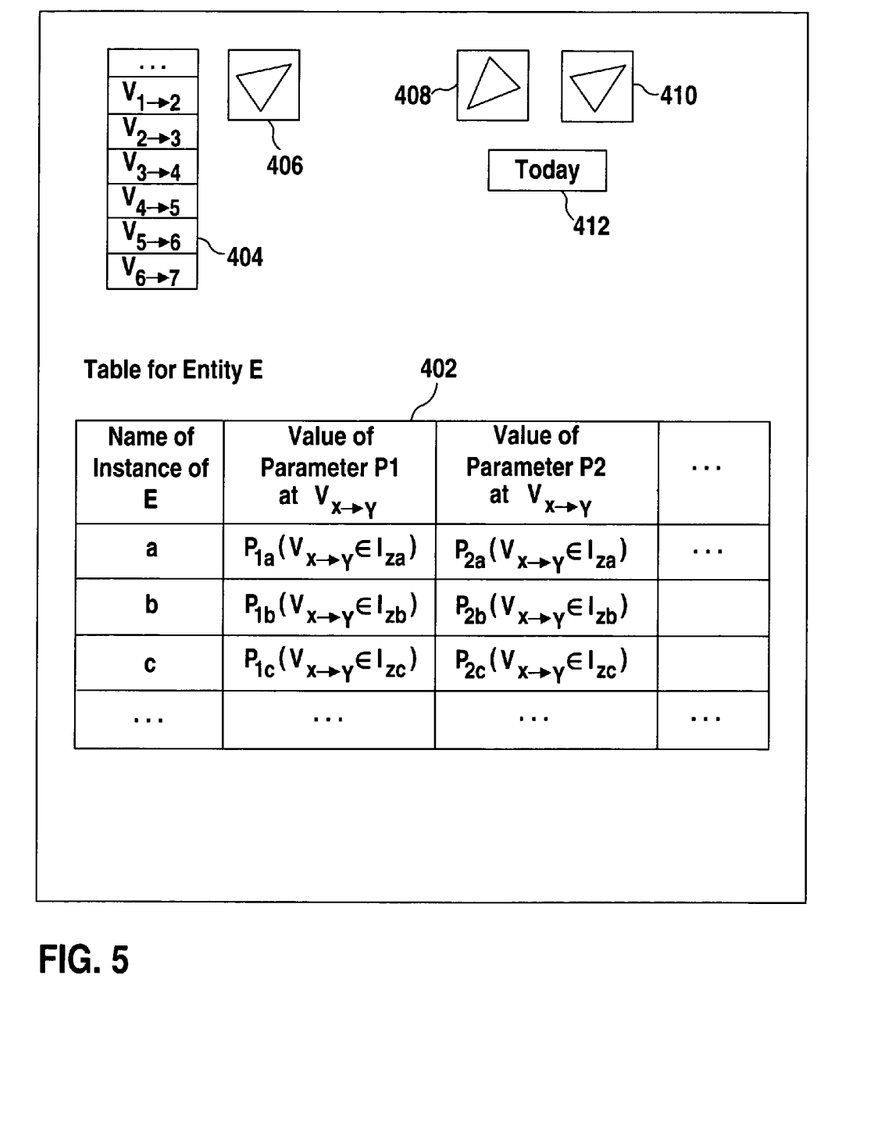
FIG. 5 shows one example of a tabular display of the data for a selected time interval and the elements of a graphical user interface which enable navigation through the time intervals.

FIG. 5 is illustrative of a corresponding display on display unit 114 (cf. FIG. 1). A window 400 with a table 402 may be displayed on display unit 114. Table 402 shows a subset of the tabular data contained in table 200 (cf. FIG. 2).

A subset is determined by the user selecting time interval $V_{x \to y}$ of the set of intervals $V_{1 \to 2}, V_{2 \to 3}, V_{3 \to 4}, V_{4 \to 5}, V_{5 \to 6}$ and $V_{6 \to 7}$ (cf. FIG. 3). Irrespective of the user's selection of a particular one of the intervals V, each of the intervals V is completely contained or equal to a time interval $I_{za}, I_{zb}, I_{zc}$ of the instances a, b, c, respectively, where z=1, 2, 3, . . . .

This way, program 106 (cf. FIG. 1) provides a filter function to reduce table 200 to table 402, which may comprise only data that is valid during a user-selected time interval V.

The selection of one of the previously identified intervals V may be done by means of drop down list 404. When a user selects the button 406, drop down list 404 appears and shows the intervals V which are available for the user's selection.

Alternatively, a user may select a time interval V by stepwise navigation. For this purpose, there may be, for example, buttons 408 and 410. When the user selects button 408, the previous time interval V may be selected. When the user selects button 410, the succeeding time interval V may be selected.

For example, if the present selection is the time interval $V_{3 \to 4}$, the user may select the preceding time interval $V_{2 \to 3}$ for the filter function, such that table 402 shows that data of table 200 (cf. FIG. 2) that does not change during the time interval $V_{2 \to 3}$ instead of interval $V_{3 \to 4}$. Likewise, the user may select the subsequent time interval $V_{4 \to 5}$ by "clicking" on button 410.

In addition, the graphical user interface may have a button 412 that corresponds to the default setting. When button 412 is selected, the user selects the time interval V which contains the present time such that table 402 then shows the data that is presently valid.

Figure 6:
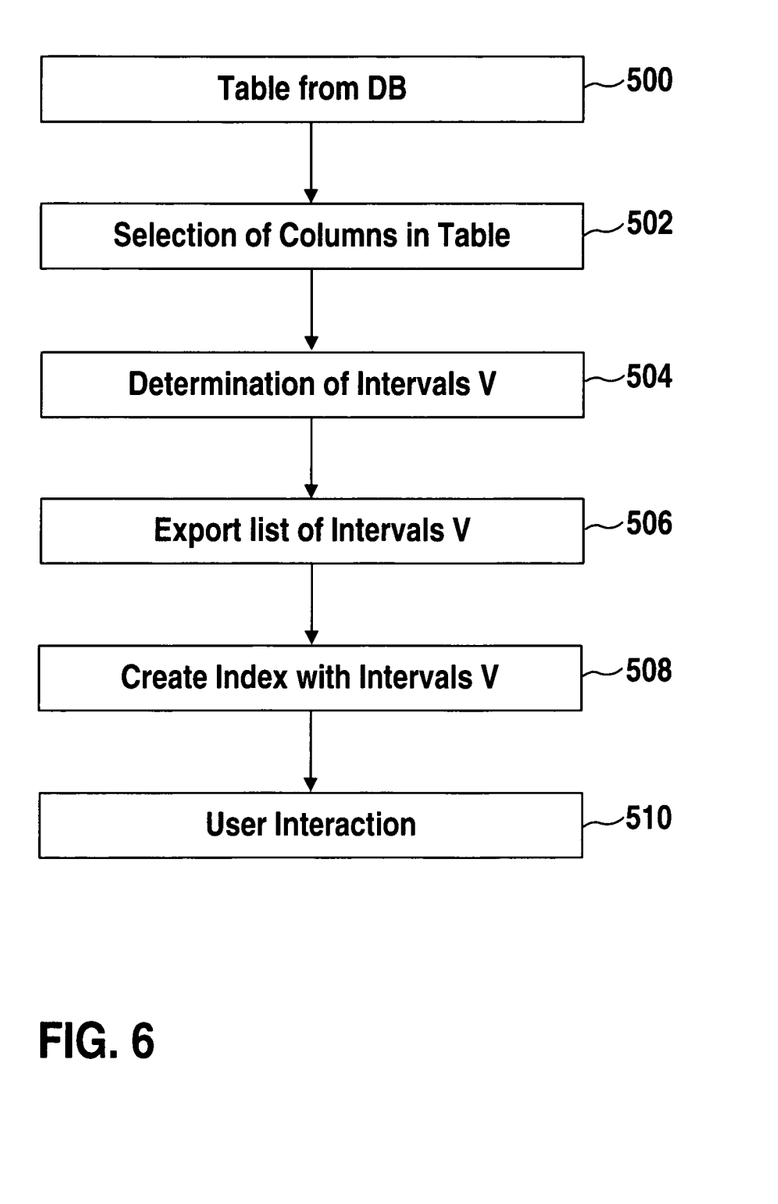
FIG. 6 illustrates a flow chart of one exemplary embodiment of a method consistent with the present invention.

FIG. 6 shows a flowchart which is illustrative of a mode of operation of computer system 100 (cf. FIG. 1). In step 500, tabular data is exported from the relational database 102. The tabular data may have a form which is equivalent to table 200 (cf. FIG. 2). In step 502, one or more columns of the table containing parameter data may be selected to form the basis of the analysis.

Analysis is performed in step 504 in order to identify time intervals V during which none of the parameter data in the selected columns change. This list of intervals V is exported in step 506 such that graphical user interface 112 can access the list of intervals V for the creation of a corresponding drop down list (cf. drop down list 404 of FIG. 4).

In step 508, an index is generated containing the intervals V as keys. Each of the keys serves to access a subset of the parameter data contained in the table 200 which is time invariant during a given interval V. In step 510 a user selects one of the intervals V to generate a corresponding display of tabular data of the type shown in FIG. 5.

Figure 7:
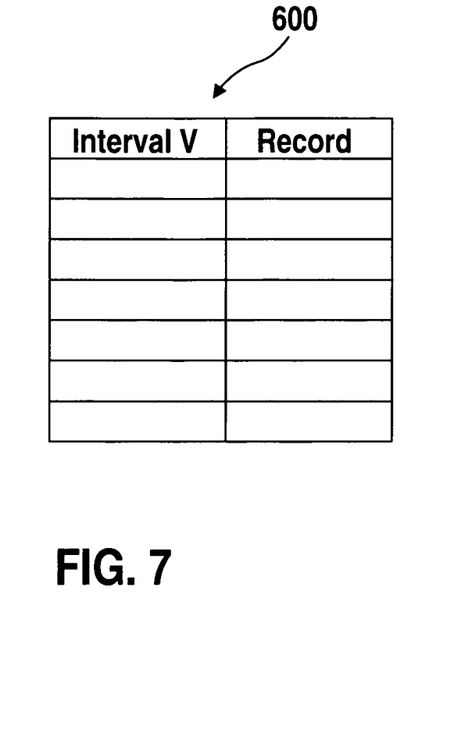
FIG. 7 shows an exemplary index which has been created in accordance with the method of FIG. 5.

FIG. 7 shows an example of an index 600. Index 600 may have the form of a look-up table and contains a list of the identified intervals V as keys. Each of the intervals V may have an associated data record that indicates a subset of table 200 containing parameter data which is time invariant during the considered time interval V. Index 600 enables the efficient generation of table 402 (cf. FIG. 4) when the user navigates along the time axis.

It is to be noted that the method of the present invention is data driven, i.e. the time intervals V are not preset but are only determined by the data itself. This provides for a maximum degree of flexibility and ease of use. Furthermore, it is to be noted that the time intervals V span the complete observation time and leave no gaps on the time axis, thereby helping to ensure that a user will not miss data when navigating along the time axis. Furthermore, it is also to be noted that the time intervals V can leave gaps on the time axis for periods of time where there are no relevant entries for parameter values of the instances. In other words, no time intervals V are created for periods of time where no data entries exist.

It will be apparent to those skilled in the art that various modifications and variations can be made in the systems and methods of the present invention as well as in the construction of this invention without departing from the scope of or spirit of the invention.

The present invention has been described in relation to a particular example which is intended in all respects to be illustrative rather than restrictive. Those skilled in the art will appreciate that many different combinations of hardware, software, and firmware will be suitable for practicing the present invention.

Moreover, other implementations of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed implementation or configuration. Thus, the true scope and spirit of the invention is indicated by the following claims.

We claim:

1. A computer executable method for displaying tabular data at a first computer, the method comprising:
    extracting the tabular data from a relational database, wherein the tabular data includes multiple entries that comprise first data representing an instance of an entity and second data comprising a time variant value having multiple parameter values associated with the entity, the time variant value is configured to change from a parameter value to a subsequent parameter value when time changes from an interval of time associated with the parameter value to a subsequent interval of time associated with the subsequent parameter value, wherein the time variant value is associated with a validity time period representing a period of time during which the time variant value associated with the first data is valid;
    determining an observation period extending from the start of the earliest validity time period to the end of the latest validity time period;
    at the first computer, automatically identifying multiple time intervals per entity in the observation period based on the time variant values of the multiple entries, wherein each of the identified time intervals represents a period of time during which the time variant value does not change from the parameter value to the subsequent parameter value;
    only after identifying the multiple time intervals, providing a user interface that allows a user the ability to select one of the multiple identified time intervals using a drop-down list and to interactively navigate the tabular data along a time axis; and
    displaying a table containing the multiple entries based on the selected time interval.

2. The computer executable method of claim 1, wherein none of the at least one time intervals in the observation period overlap and wherein the concatenation of all of the at least one time intervals covers the entire observation period.

3. The computer executable method of claim 1 further comprising generating an index comprising each of the at least one time intervals as keys to first data and associated parameter values being valid during one of the at least one time intervals.

4. The computer executable method of claim 1 further comprising generating a menu for a user's selection of one of the at least one time intervals.

5. The computer executable method of claim 1 further comprising providing a selection component of a graphical user interface for stepwise selection of the at least one time intervals.

6. The computer executable method of claim 1 further comprising providing a present time selection component of a graphical user interface for selecting one of the at least one time intervals comprising the present time.

7. The computer executable method of claim 1 further comprising selecting the first and the second data from the tabular data before the determination of the at least one time intervals.

8. A computer program product stored on a computer-readable medium, the computer program product comprising a program component adapted to operate a computer according to the method of claim 1.

9. A computer system for displaying tabular data, the system comprising:
    a memory; and
    a processor configured to:
        extract, into the memory, the tabular data from a relational database, wherein the tabular data includes multiple entries, wherein at least one of the multiple entries comprises first data representing an instance of an entity and second data comprising a time variant value having multiple parameter values associated with the entity, the time variant value is configured to change from a parameter value to a subsequent parameter value when time changes from an interval of time associated with the parameter value to a subsequent interval of time associated with the subsequent parameter value, wherein the time variant value is associated with a validity time period representing a period of time during which the time variant value associated with the first data is valid;

determine an observation period extending from the start of the earliest validity time period to the end of the latest validity time period;

automatically identify multiple time intervals in the observation period based on the time variant values of the multiple entries, wherein each of the identified time intervals represents a period of time during which the parameter values of the time variant values do not change;

only after the multiple time intervals have been identified, provide a user interface that allows a user the ability to select at least one of the multiple identified time intervals using a drop-down list and to interactively navigate the tabular data along a time axis; and display a table containing the multiple entries based on the selected time interval.

10. The computer system of claim 9, wherein none of the at least one time intervals in the observation period overlap and wherein the concatenation of all of the at least one time intervals covers the entire observation period.

11. The computer system of claim 9, wherein the processor is configured to generate an index comprising each one of the at least one time intervals as keys to first data and associated parameter values being valid during one of the at least one time intervals.

12. The computer system of claim 9, wherein the processor is configured to provide the user interface including a menu for a user's selection of one of the at least one time intervals.

13. The computer system of claim 9, wherein the processor is configured to provide the user interface including a stepwise selection of a time interval of the at least one time intervals.

14. The computer system of claim 9, wherein the processor is configured to provide the user interface including a present time selection component for selecting one of the at least one time intervals comprising the present time.

15. The computer system of claim 9 further comprising a relational database for selecting first and second data of the tabular data for the purpose of determining the at least one time intervals.

16. A computer executable method for displaying tabular data, the method comprising:

extracting the tabular data from a relational database, wherein the tabular data includes multiple entries that comprise first data representing an instance of an entity and second data comprising a time variant value having multiple parameter values associated with the entity, the time variant value is configured to change from a parameter value to a subsequent parameter value when time changes from an interval of time associated with the parameter value to a subsequent interval of time associated with the subsequent parameter value, wherein the time variant value is associated with a validity time period representing a period of time during which the time variant value associated with the first data is valid;

determining an observation period extending from the start of the earliest validity time period to the end of the latest validity time period;

automatically identifying multiple time intervals in the observation period based on the time variant values of the multiple entries, wherein each of the identified time intervals represents a period of time during which the parameter values of the time variant values do not change;

only after identifying the multiple time intervals, providing a user interface that allows a user the ability to select one of the multiple identified time intervals using a drop-down list and to interactively navigate the tabular data along a time axis; and displaying a table containing the multiple entries based on the selected time interval.

* * * * *